United States Patent [19]

Pischinger et al.

[11] Patent Number: 5,271,265

[45] Date of Patent: Dec. 21, 1993

[54] PROCESS AND DEVICE FOR SENSING AND EVALUATING KNOCKING COMBUSTION DURING OPERATION OF AN INTERNAL COMBUSTION ENGINE

[75] Inventors: Franz Pischinger; Hans-Peter Kollmeier, both of Aachen, Fed. Rep. of Germany

[73] Assignee: FEV Motorentechnik GmbH & Co. KG, Aachen, Fed. Rep. of Germany

[21] Appl. No.: 723,725

[22] Filed: Jun. 20, 1991

Related U.S. Application Data

[63] Continuation-in-part of Ser. No. 518,318, May 7, 1990, abandoned, which is a continuation of Ser. No. 261,138, Oct. 19, 1988, abandoned.

[30] Foreign Application Priority Data

Oct. 26, 1987 [DE] Fed. Rep. of Germany ....... 3736160

[51] Int. Cl.⁵ .............................................. G01L 23/22
[52] U.S. Cl. ...................................................... 73/35
[58] Field of Search ............... 73/35, 116; 123/419, 123/425, 435

[56] References Cited

U.S. PATENT DOCUMENTS

| | | | |
|---|---|---|---|
| 4,308,519 | 12/1981 | Garcea et al. | 73/35 |
| 4,369,748 | 1/1983 | Steinke et al. | 123/425 |
| 4,393,687 | 7/1983 | Müller et al. | 73/35 |
| 4,397,283 | 8/1983 | Komaroff et al. | 73/35 |
| 4,412,446 | 11/1983 | Linder et al. | 73/35 |
| 4,416,235 | 11/1983 | Utsumi et al. | 73/35 |
| 4,437,334 | 3/1984 | Laurenz | 73/35 |
| 4,715,341 | 12/1987 | Douaud et al. | 723/425 |
| 5,052,214 | 10/1991 | Dils | 73/35 |

FOREIGN PATENT DOCUMENTS

| | | |
|---|---|---|
| 2932193 | 2/1980 | Fed. Rep. of Germany . |
| 3110996 | 9/1982 | Fed. Rep. of Germany . |
| 3108460 | 11/1982 | Fed. Rep. of Germany . |

*Primary Examiner*—John E. Chapman
*Attorney, Agent, or Firm*—Watson, Cole, Grindle & Watson

[57] ABSTRACT

In a process and device for sensing and evaluating knocking combustion during operation of an internal combustion engine the electromagnetic radiation in a combustion chamber thereof, which changes upon knocking combustion, is detected and transmitted to a measuring and/or processing device. The occurrence of knocking combustion can be precisely determined by measuring the rate of increase in the intensity of the electromagnetic radiation in a volume of the open combustion chamber which is displaced from the spark plug and which is less than 0.04%, preferably 0.004%, of the displacement volume in the top piston dead center.

6 Claims, 6 Drawing Sheets

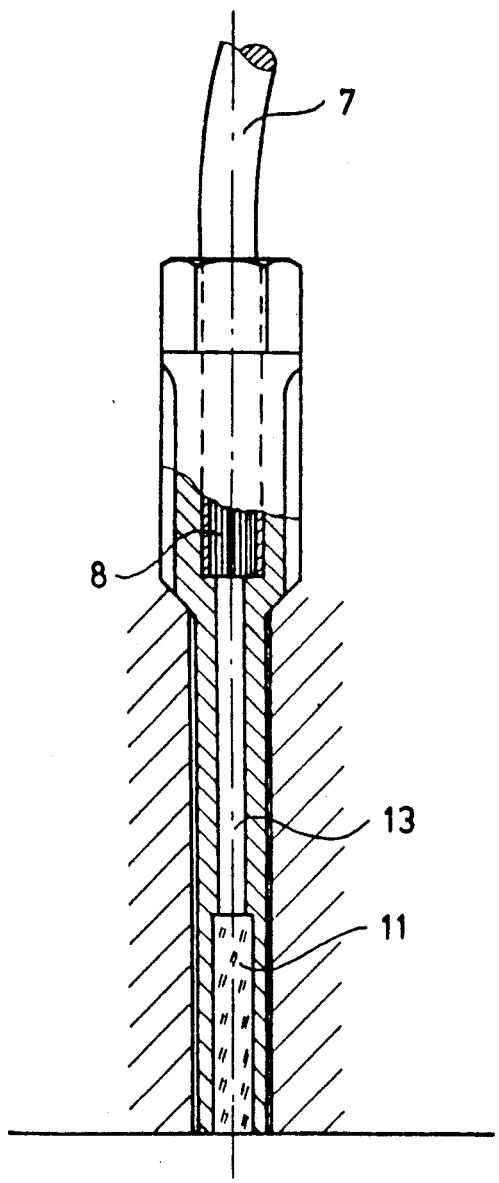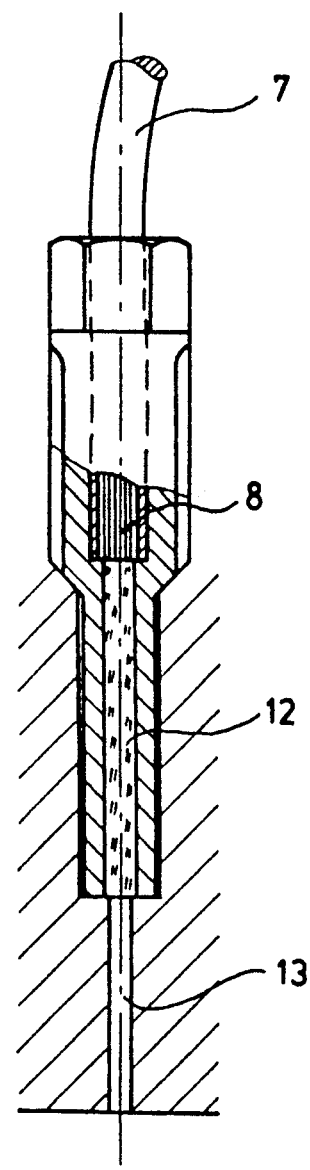

FIG. 10
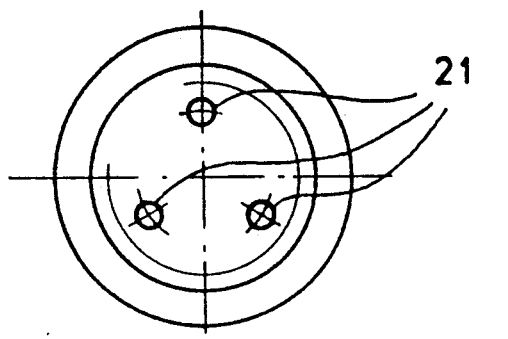
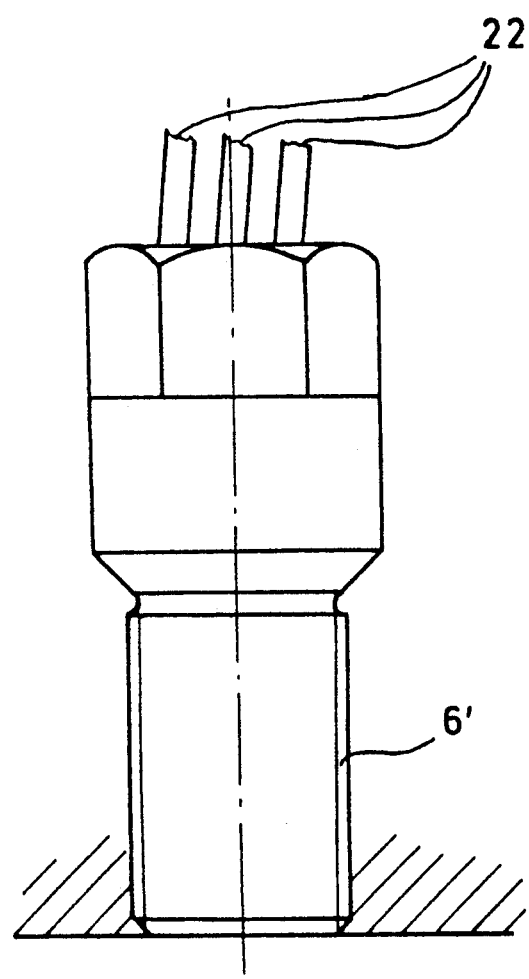
FIG. 11

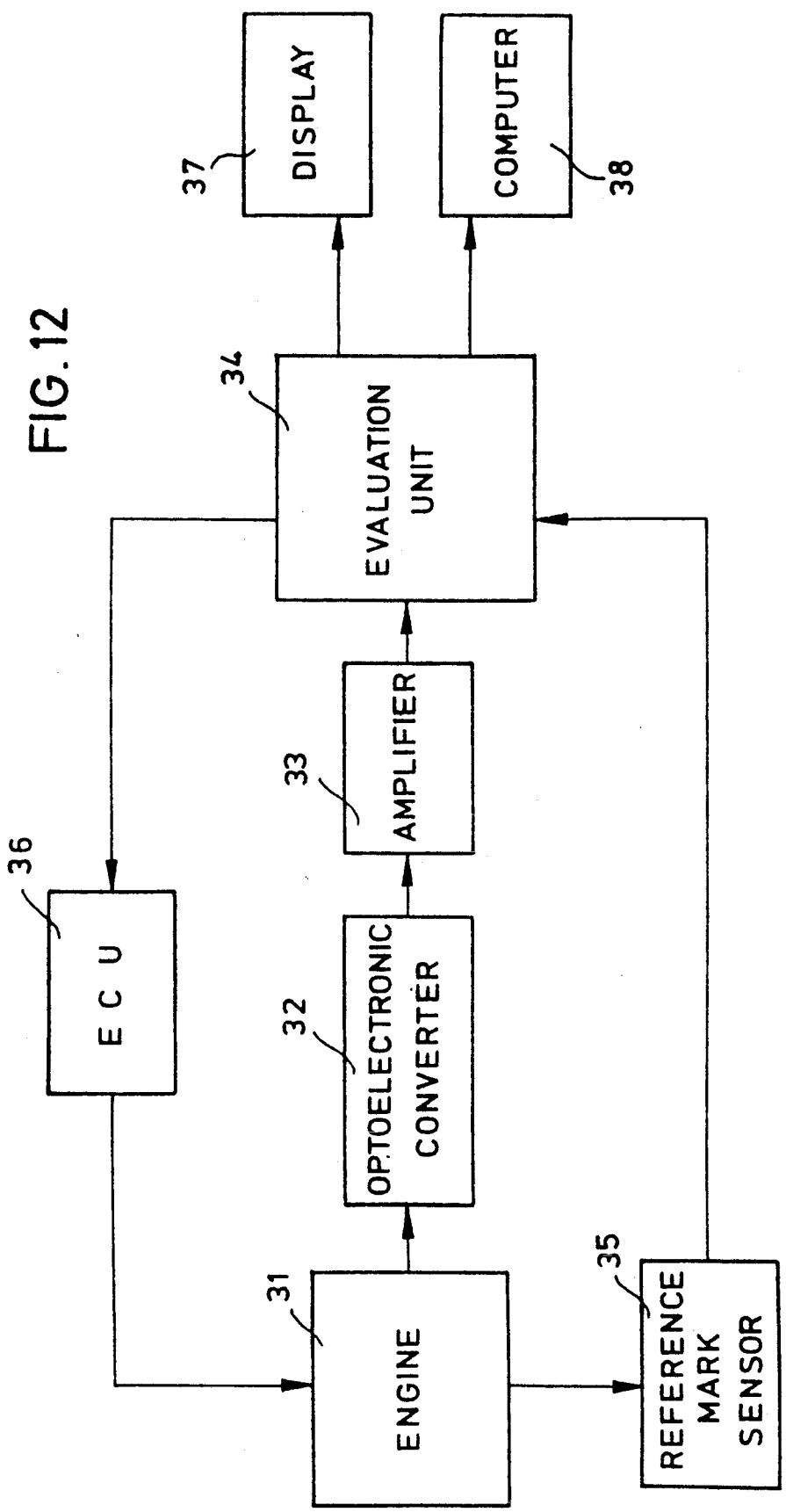

PROCESS AND DEVICE FOR SENSING AND EVALUATING KNOCKING COMBUSTION DURING OPERATION OF AN INTERNAL COMBUSTION ENGINE

This application is a continuation-in-part of application Ser. No. 518,318, filed May 7, 1990, abandoned, which is a continuation of application Ser. No. 261,138, filed Oct. 24, 1988, abandoned.

BACKGROUND OF THE INVENTION

This invention relates to a process and a device for sensing and evaluating knocking combustion during operation of an internal combustion engine. In a combustion chamber of the engine, the electromagnetic radiation, which changes with knocking combustion, is detected and transmitted to a measuring and/or processing device.

The actual efficiency of internal combustion engines is largely dependent on the compression ratio. In general, an increase in compression ratio results in significantly reduced fuel consumption, particularly in the part-throttle region, based on values of current production internal combustion engines. However, this increase is limited by the occurrence of knocking combustion with a high engine load.

In engine technology an abnormal combustion phenomenon is referred to as "knocking" which is caused by an extraordinarily fast reaction of the combustible mixture compared to normal combustion of engines and arises in the latter interval of the combustion phase. The precise processes that take place during knocking combustion are, to this day, not clearly explained. The most widespread theory is that knocking involves auto-ignition processes in the mixture which has not yet been touched by the flame. Following auto-ignition, the velocity of the flame can be in supersonic range relative to sonic speed in the burned mixture and in the unburned mixture. Furthermore, the damage typically caused by knocking is indicated by shockwaves which arise during knocking combustion.

In the definition of the term "knocking", no distinction is usually made between the first auto-ignition phenomenon with subsequent fast reaction of the combustible mixture, and the thereby induced oscillations of the burned and unburned mixture in the combustion chamber. Thus, the fast reaction of the combustible mixture constitutes the primary effect, and the subsequent oscillations of the burned and unburned mixture in the combustion chamber constitute the secondary effect.

If an internal combustion engine is operated with knocking combustion, it can result in the destruction of the engine. In order to assure destruction-free operation, makers of internal combustion engines must, when setting the ignition point, either maintain a greater distance from the knock limit or use a knock control system, particularly due to varying qualities of fuel and due to variances in the compression ratio in the assembly production, the ignition process, etc.

If such control system is used, it is not necessary to maintain the aforementioned safety distance. However, it is desirable to use a suitable device and a suitable process during engine operation to recognize or decide whether or not there is any knocking. Then, the corresponding operating parameters are adjusted in such a manner via a corresponding control unit that the engine is operated directly on the knock limit. When this condition is fulfilled, the goal is to achieve maximum efficiency in an engine with high compression ratio.

Several processes in and devices for the sensing of knocking are known with which one or more physical values or processes that change only during knocking or arise only during knocking can be detected.

German Patent Disclosure Document DE-OS 31 08 460 discloses a process in which the electromagnetic radiation, emitted during combustion, is evaluated relative to the oscillations that occur upon knocking. However, here the secondary effects of knocking combustion, namely oscillations, are detected. Since these secondary effects are dependent on the structure of the engine, i.e., the shape of the combustion chamber, etc., and the location of the sensor in a controlled system, the data relating to the overall valid knock intensity, which is transferrable to various engines, are not problem free.

German Patent Disclosure Document DE-OS 29 32 193 relates to a device in which, to obtain a higher thermal efficiency, ionization probes are used as flame front probes of which at least two per cylinder must always be available to detect the travel time of the flame and thus the flame propagation velocity. The drawback with this approach is that the error potential with the use of two probes is very high since the propagation mechanism of the flame is not precisely known and is not constant. The use of many ion current probes does not make it easier to determine the speed of the flame. Moreover, this prior art approach presents a drawback because of its high cost of production. Another drawback of the ion current probe is that due to the shock waves, arising during knocking combustion, the fine wires of the ion current probes are rapidly destroyed and thus the device is more susceptible to failure.

German Patent Disclosure Document DE-OS 31 10 996 relates to a sensor system for detecting physical parameters in the combustion chamber of an internal combustion engine in which the end of a receiver, which is subjected to the comustion chamber, is thickened in the shape of a mushroom. This approach does not restrict but rather increases the sensed volume. Such a system is suitable primarily for detecting secondary effects, in particular the oscillations of the fuel, induced by auto-ignition, in the combustion chamber. However, if the sensor exhibits a cavity similar to a heat pipe, essentially only the processes in the cavity, or via several openings over a wide range of the main combustion chamber, are observed.

In U.S. Pat. No. 4,393,687 the sensing of the combustion chamber is via a pre-chamber in which the mixture which is contained there is spark-ignited. Thus, there are totally different conditions compared to direct sensing of the main combustion chamber of an internal combustion engine, since the igniting processes in the pre-chamber superimpose the signals emitted from the knock phenomenon in such a manner as to interfere with a precise measurement. Moreover, the region of the cylinder loading, which is detected at the earliest after spark ignition of the flames, is observed by a sensor. However, this region is already completely burned when the knocking begins so that no primary effects of knocking combustion occur here.

SUMMARY OF THE INVENTION

The object of the present invention is to provide a process which facilitates a safe, faultless sensing of the primary effect of knocking combustion during operation of the internal combustion engine and, in particular, to avoid the aforementioned drawbacks. In the type of process described above, this problem is solved by the invention in that the volume of the open combustion chamber in the top piston dead center ascertained by the measurement is less than 0.04%, preferably 0.004%, of the displacement volume.

In general, the advantage in evaluating the electromagnetic radiation, which changes during knocking combustion, is that the processes in the combustion chamber are detected directly and that the optical signals of the combustion engine are free from electrical and mechanical disturbances.

If the observed volume is too large, the intensity of the electromagnetic radiation caused by the normal combustion is on a high level. When knocking occurs in this stage, the increase in the electromagnetic radiation is low. Reducing the observed volume leads to a lower level of the electromagnetic radiation caused the non-knocking combustion. In this case a steep increase in the electromagnetic radiation in relation to the electromagnetic radiation of the non-knocking combustion is observed when knocking occurs. The electromagnetic radiation emitted by the burning gases in the combustion chamber is detected by an optical sensor. Upon knocking combustion, the reaction front of the burning gases moves as a wave at a supersonic velocity. As the supersonic wave moves through the combustion chamber and toward the optical sensor, a very rapid increase in radiation intensity is observed by the optical sensor. Because the optical sensor is sufficiently displaced from the spark plug, the faster moving emitted radiation of the supersonic wave generated by knocking combustion reaches the sensor before radiation emitted from normal combustion has a chance to. Thus, the supersonic wave is detected in an especially pure form, i.e., without superimposition of light emission from normal combustion, which also occurs in the combustion chamber. The optical sensors proposed in the prior art, which evaluate the oscillations of light emission during the combustion in an internal combustion engine, are constructed in such a manner, and must be so constructed that the maximum combustion chamber volume is detected. This is necessary because the resonance oscillations of the combustion chamber, which occur upon knocking, are to be evaluated by the subsequent signal processing. If, for example, a prior art optical sensor in the form of a bundle of glass fibers is arranged in the middle electrode of a spark plug, the result is that a larger solid angle can be observed in the combustion chamber. Due to the total reflection processes in the light guide rod, the arrangement, which has, for example, a light guide rod in the middle electrode, has a very large optical angle of observation. The optical angle of observation is particularly high if, at the end on the side of the combustion chamber, the sensor has a convex curved lens which results in a large observation volume.

However, if a light guide rod is mounted on the base of a pre-chamber spark plug, as in the aforementioned U.S. Patent, the electromagnetic radiation is essentially detected in the pre-chamber. However, other combustion conditions prevail here than in the actual combustion chamber of the combustion engine.

The supersonic wave, which occurs upon knocking combustion, provides a steeper first rate of increase in radiation intensity detected by the optical sensor than the first rate detected upon non-knocking combustion in the volume to be measured, provided the supersonic wave flows through the volume to be measured. Consequently, the invention also provides that a signal, representing the occurrence of knocking combustion, be transmitted to an evaluator, when upon knocking combustion the rate of increase in the radiation intensity in the volume to be measured over time is at least three times, preferably twenty times, higher than during non-knocking combustion. At the same time, it is important that in the process of the invention, the periodic intensity oscillations (secondary effect) caused by the supersonic wave reflecting throughout the combustion chamber during knocking combustion, are not used for evaluation but rather the first increase in intensity (primary effect) in a volume is to be measured.

The result of the supersonic wave, which occurs upon knocking combustion, after its first steep increase in intensity, is a significantly higher level of electromagnetic radiation. The comparison of this level of intensity after the first increase with that upon non-knocking combustion permits a clear identification of knocking combustion. Thus, in accordance with the invention a signal, which represents the occurrence of knocking combustion, is transmitted to an evaluator, when the level of the emitted radiation after the first increase during knocking combustion is at least three times, preferably ten times, higher than that during non-knocking combustion.

Another feature of the invention includes the arrangement of at least three optical measuring points, whose measurement results are transmitted to a processor for determining the speed of the flame.

BRIEF DESCRIPTION OF THE DRAWINGS

FIGS. 6 and 7 are longitudinal views, partly in section, of further embodiments of optical sensors for measuring the intensity of the electromagnetic radiation in the combustion chamber;

FIG. 10 is a top plan view of the FIG. 11 sensor embodiment;

FIG. 11 is an elevational view of an optical sensor, having three optical measuring points, according to another embodiment of the invention; and FIG. 12 is a flow chart of an evaluator circuit for carrying out the process according to the invention.

DETAILED DESCRIPTION OF THE INVENTION

Figure 1:
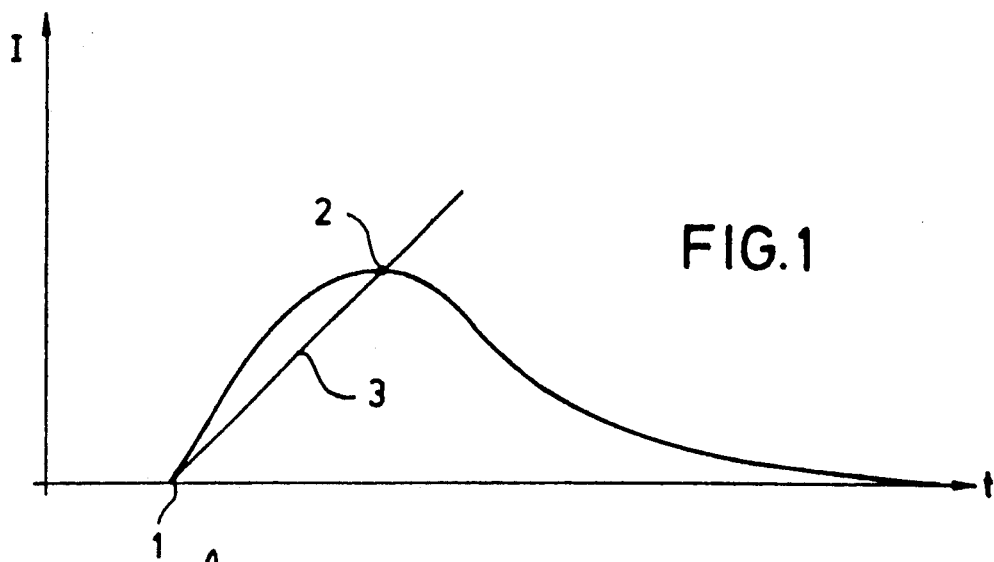
FIG. 1 is a graph showing the curve of the intensity of the electromagnetic radiation in the combustion chamber during normal, thus non-knocking combustion.
Figure 2:
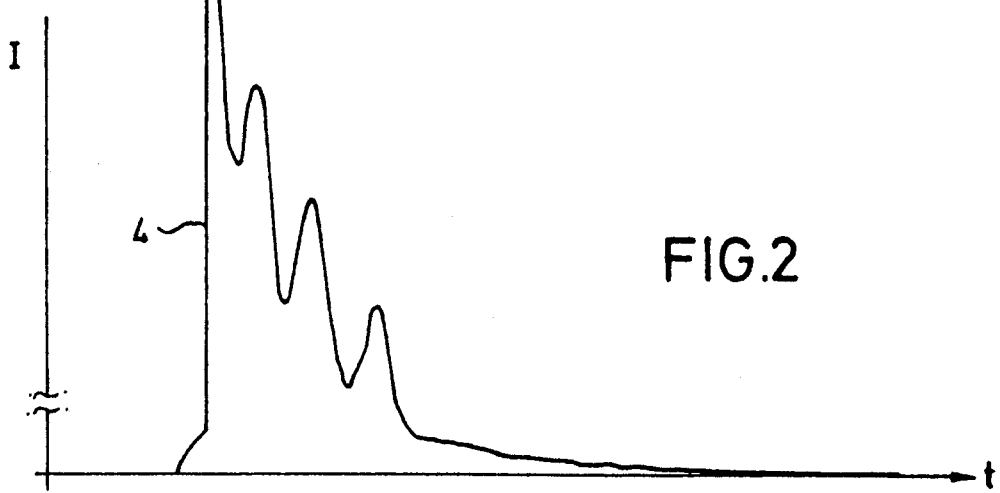
FIGS. 2 and 3 are graphs showing curves of the intensity of the electromagnetic radiation in the combustion chamber during knocking combustion.
Figure 3:
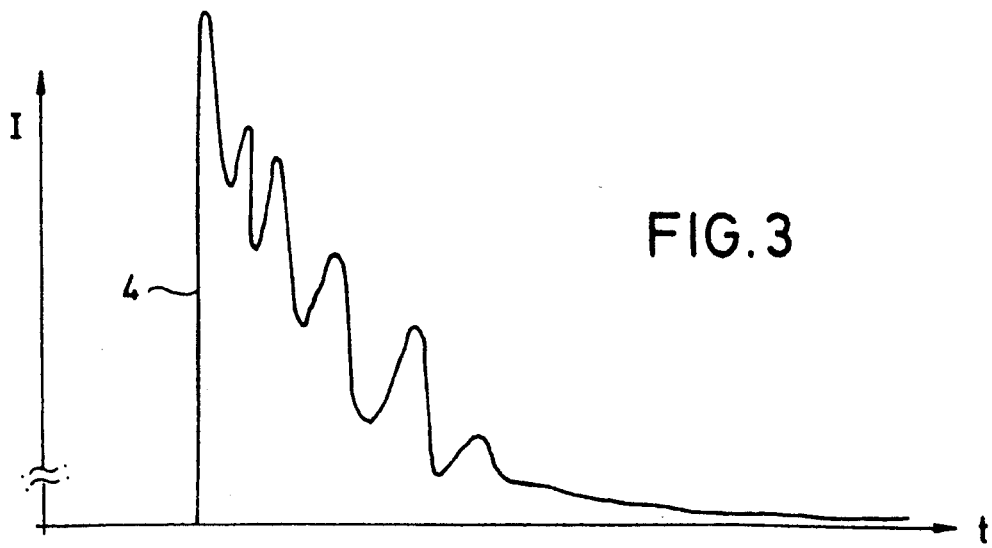

In FIG. 1, as compared to FIGS. 2 and 3, a difference can be seen between knocking and non-knocking engine operation from the curve of the rate of increase in intensity of radiation I in particular due to the fact that during normal combustion the gradient of the curve of the intensity of radiation is smoothly decreasing after an initial increase, whereby maximum intensity occurs after the first increase. If a fictitious increase of radiation intensity is defined by a straight line 3, which connects point 1 of the first increase of radiation and point 2. An evaluation of the maximum radiation, then a clearer separation between knocking and non-knocking engine operation can be defined. Thus, the invention also provides that the increase in the intensity of radiation can be shown by a straight line 3, which results from connecting the first increase 1 of the radiation intensity and the first maximum 2 of the radiation intensity, if the curve of the radiation intensity I is measured as a function of time t.

FIG. 2 is a graph showing the curve of the intensity of the electromagnetic radiation in the combustion chamber using a very small observation volume. In this case first the non-knocking combustion penetrates the observation volume characterized by the slow increase in the measured signal. Afterwards knocking occurs and the measured signal shows a corresponding steep increase.

FIG. 3 is a graph showing the curve of the intensity of the electromagnetic radiation in the combustion chamber using a very small observation volume. In this case the non-knocking combustion does not penetrate into the observation volume before knocking occurs. When knocking occurs the measured signal shows a corresponding steep increase.

The steep rate of increase in radiation intensity during knocking combustion causes a resonance frequency within the combustion chamber which is significantly higher than during normal non-knocking combustion.

After the typical increase in intensity corresponding to line 4, subsequent oscillation occur. They are caused by reflection of the supersonic wave running through the combustion chamber. The frequency of the subsequent oscillations corresponds to the lowest resonance frequency of the combustion chamber. The lower resonance frequencies of the combustion chamber of normal production engines range from 6 to 8 kHz. These subsequent oscillations are not caused by the primary effect of knocking combustion. The knocking combustion causes pressure waves which run through the combustion chamber and are reflected at the combustion chamber walls. The reflected supersonic wave causes the subsequent oscillations.

The frequencies in the electromagnetic signal above 10 kHz are caused by the steep rate of increase in radiation intensity during knocking combustion. This primary effect in the electromagnetic radiation is caused by the knocking combustion through the observed volume, i.e., the steep rate of increase in the electromagnetic radiation according to line 4, causes a frequency above 10 kHz by itself.

Another effect caused by the primary effect is that the maximum intensity of the electromagnetic radiation directly after the steep increase is a multiple of the maximum electromagnetic radiation during normal combustion.

These two effects, the steep increase and the higher maximum in the electromagnetic radiation, can be used to detect knocking combustion. An evaluation of the radiation intensity signal above the resonance frequency permits a clear differentiation between knocking and non-knocking engine operation. Thus, another advantageous feature of the invention provides that only the frequency content of the signal, which represents the emission of electromagnetic radiation as a function of time, is evaluated that is greater than 10 kHz. Values above 50 kHz are given priority in this process.

As a device for carrying out the process according to the invention, an optical sensor is mounted in a cylinder head of the engine. The sensor comprises a hollow tube, a planar-convex lens sealing an inner end of the tube and facing the combustion chamber, and the tube having a light-absorbing surface along its inner wall.

Figure 4:
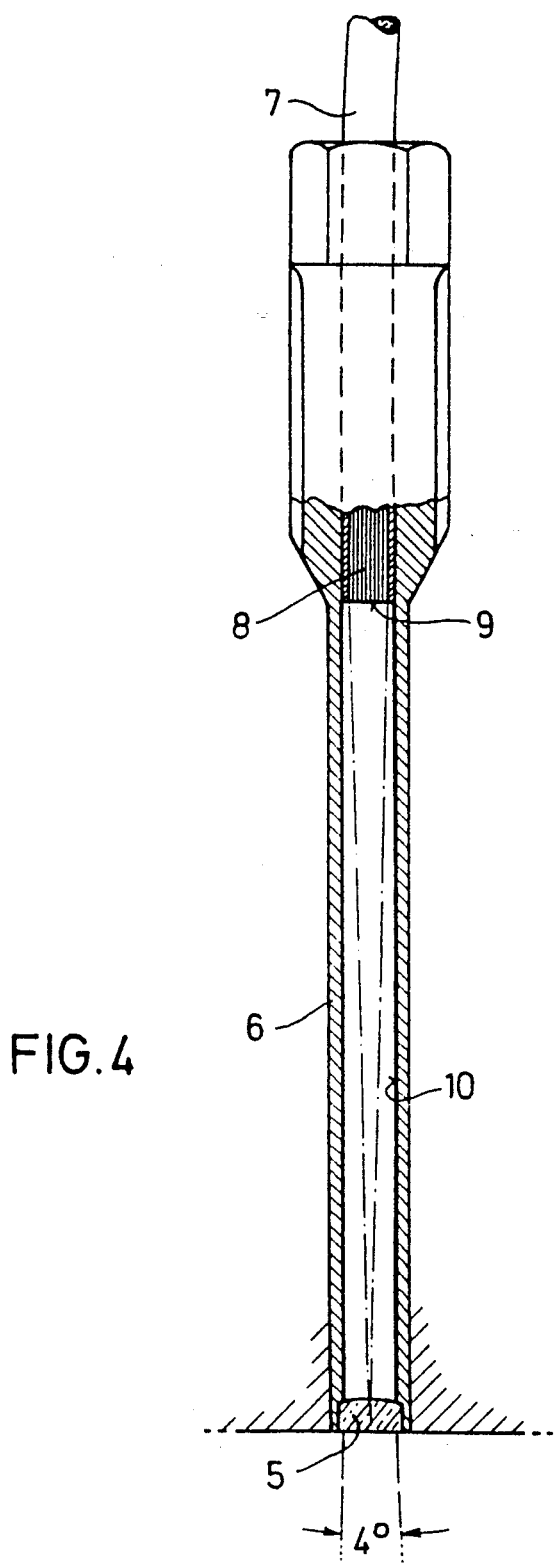
FIG. 4 is a longitudinal view, partly in section, of an embodiment of an optical sensor according to the invention for measuring the intensity of the electromagnetic radiation in the combustion chamber.

Such optical sensor is illustrated in FIG. 4 and comprises a planar-convex lens 5 sealing the inner end of tube 6 which is mounted in a cylinder head 16, the lens facing the combustion chamber below the cylinder head. A light guide cable 7, which contains light guide fibers 8, extends from the tube. With such arrangement, the inner ends of fibers 8 define an optical aperture 9 in the focal plane of lens 5. The inner wall of the tube is provided with a light-absorbing surface 10. The light rays are bundled in the focal plane by the lens 5. All light rays, which strike surface 10 of the tube, are absorbed, and therefore do not get into the light guide cable 7 and are not detected by the subsequent evaluation.

A sensor can also be used in which the light guide fibers 8 are substituted for a light guide rod, or in which a photoelectric converter is directly mounted above the optical aperture.

The optical sensor according to the invention is designed to detect a very small volume of the combustion chamber. Thus, the sensor according to FIG. 4 has a viewing angle of approximately 4°.

With such a small optical viewing angle only a very small volume of the combustion chamber is detected. This small optical viewing angle is achieved by the plano-convex lens 5 mounted on the side of the combustion chamber and sealed at the end of tube 6, such that due to the tube 6 optical aperture 9 is in focal plane of lens 5. Light rays entering the optical sensor under an angle more than the angle of optical view will be absorbed at the light absorbing surface.

Figure 5:
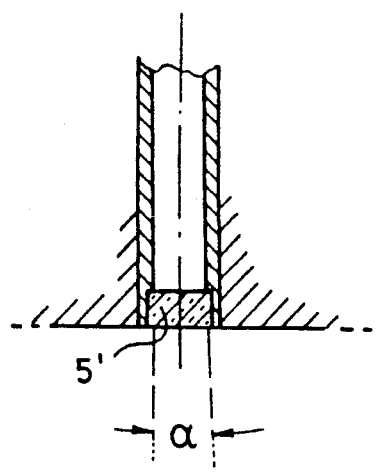
FIG. 5 is a fragmentary view similar to FIG. 4 of another embodiment of the optical sensor.

In the FIG. 5 embodiment the plano-convex lens 5 is replaced by a thin plano-parallel window 5'. Otherwise, the sensor is structured the same as that described with reference to FIG. 4. Also, by this embodiment a very small viewing angle α is realized, because all light rays which are entering the optical sensor under an angle more than the angle of optical view will be absorbed at the light absorbing surface 10.

In accordance with another optical sensor embodiment the combustion chamber pressure can be sealed by a rod 11 or a rod 12 of transparent (sapphire or glass) material (FIG. 6 and 7). The viewing angle to be maintained as small as possible can be effected by the provision of a thin elongated passageway or hole 13, which has a light absorbing surface 10. In FIG. 6 rod 11 seals the inner end of the tube and faces the combustion chamber. Passageway 13 is of less cross-section compared to that of the rod and the light guide fibers 8. An optical aperture 9 is located in both FIGS. 6 and 7 at the end of hole 13. With the optical aperture and the light absorbing surface all light rays will be absorbed which are entering the optical sensor by an angle more than the angle of optical view. Also, this embodiment leads to a small optical viewing angle due to absorbing effects on light absorbing surface 10.

In FIG. 7, this thin passageway or hole 13 is located in cylinder head 16 and extends between the outer end of rod 12 and the combustion chamber for realizing a small optical viewing angle due to absorbing effects on light absorbing surface 10.

Figure 8:
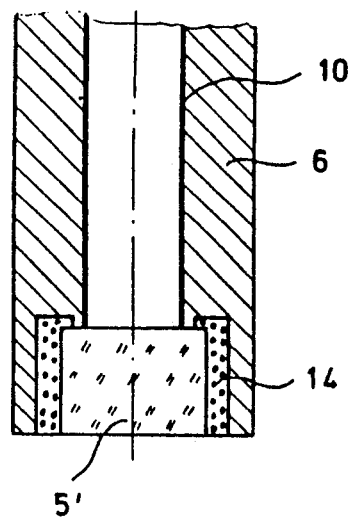
FIG. 8 is a fragmentary view, similar to FIG. 5, of another embodiment of an optical sensor which includes a thermal insulation layer applicable to the FIGS. 4 to 7 embodiments.

To avoid pollution on the side of the combustion chamber, the lens 5, window 5', rod 11 and/or rod 12 can be encased along the side wall thereof in a layer of thermal insulation 14 (FIG. 8) such that a heating up by means of the gases in the combustion chamber occurs in such manner that combustion residues are burned up. The radiation-transparent window 5, 5', 11 and 12 can be embedded in the insulation material.

Figure 9:
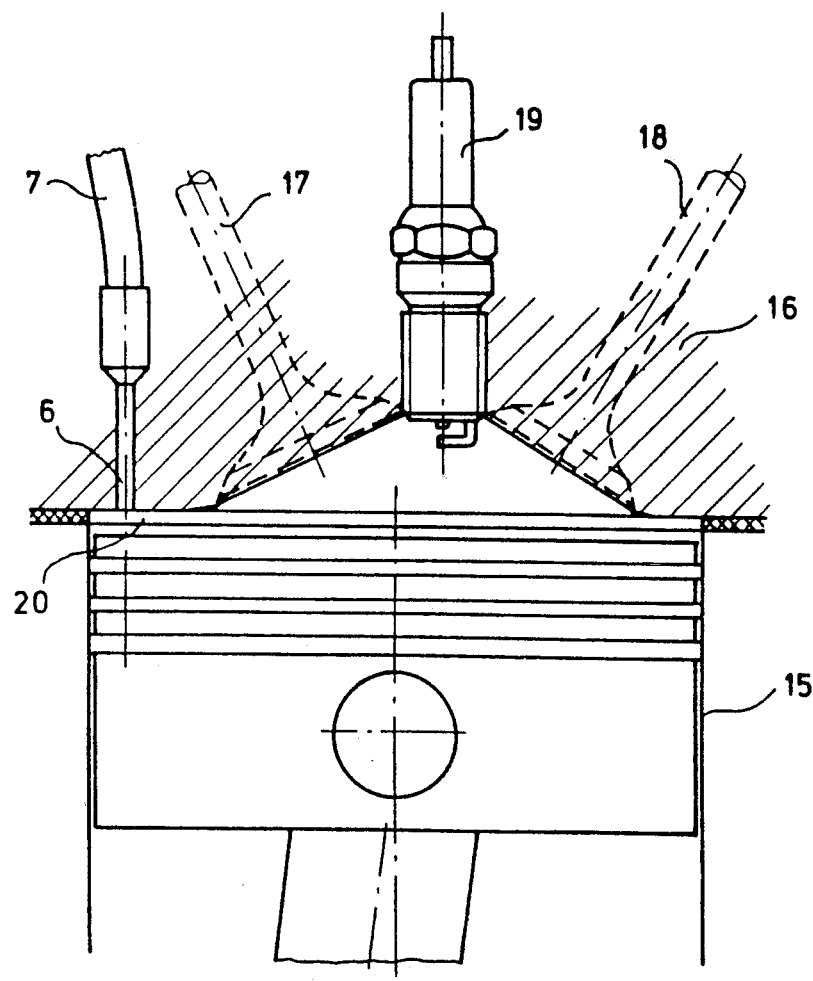
FIG. 9 is an elevational view of a piston/cylinder arrangement, partly in section, of an internal combustion engine with an optical sensor of the invention mounted in the cylinder head.

A piston/cylinder arrangement 15 is shown in FIG. 9 with cylinder head 16 in which valves 17 and 18 and a spark plug 19 are arranged in a conventional manner. The optical sensor according to the invention with its light guide cable 7 and tube 6 are mounted in the cylinder head above the left portion of combustion chamber 20, and in particular in such a manner that the sensor detects the regions of the combustion chamber that are a spaced distance from spark plug 19. The steep increase in radiation intensity can be viewed in an especially pure form by arranging the sensors in such a manner that only those regions of the combustion chamber are detected that are far away form the spark plug so that when knocking begins they are not touched by the flame. This arrangement offers the advantage that in a spark igniting combustion engine the optical sensors are arranged in such a manner that those regions of the open combustion chamber are detected that are far away from the ignition device.

The process of the invention offers another advantage that in addition to the evaluation of the radiation intensity over time, the speed of the flame can be precisely determined independent of its direction of spread. For this purpose, as shown in FIGS. 10 and 11, three optical test points 21, which outwardly transmit the viewing results via three light guide cables 22 for further evaluation, face the combustion chamber. This optical sensor 6' is otherwise similar to that described in FIGS. 4, 5, 6 or 7.

As described above, the speeds of the flames during knocking combustion are significantly higher than during non-knocking combustion, and thus in accordance with the invention it is possible to determine precisely the speed of the flame because the volume detected by the measurement in the upper piston dead center is less than 0.04% of the displacement arrangement of at least three optical test points with the aid of a corresponding mathematical evaluation without knowing beforehand the direction of the spread. This is not possible with the provision of only two test points, as would have been the case, for example, when measuring with two ion current probes according to prior techniques.

FIG. 12 is a signal flow chart of an embodiment of an evaluation circuit for applying the process according to the invention. The electromagnetic radiation, emitted during combustion in the combustion chamber of an engine 31, is converted in an optoelectric converter 32 into a voltage signal proportional to the radiation intensity. Both models which operate according to the external photoelectric effect (photomultiplier) are suitable as components, which use the internal photoelectric effect (photo diodes).

The signals are amplified in a subsequent amplifying circuit. Due to the increase in intensity occurring upon knocking combustion, this amplifying circuit 33 has a threshold frequency, which is far above the lower resonance frequency of the combustion chamber.

The signal is processed in an evaluator 34. For a multi-cylinder engine, if each cylinder is to be evaluated, information must flow into the evaluator 34 via the crankshaft setting. This can be achieved with the aid of a reference generator 35.

The information from evaluator 34, in particular whether the engine is or is not knocking, can be fed into a conventional electronic engine control unit (ECU) 36.

In order to compensate for the contamination of the optical sensor, the signal can be normalized in the evaluator 34. This normalization can for example, be integral via one or more work cycles or via the maximum values of the electric signals, representing the radiation intensity. Normalization is also conceivable with a weighting factor according to a stored function so that the previous work cycles can be weighted differently. The increase in radiation intensity can be determined, for example, by means of differentiation via all the signals or between threshold values. In particular, the fictitious signal increase can be determined. To determine whether or not the engine is knocking, the criteria, described above, can be separated or can be used in combination.

The result of such a signal evaluation can also be transmitted via a display device 37 and/or transmitted into a data processor 38. Thus, such an evaluator can be installed in both production vehicles and in laboratory facilities.

What is claimed is:

1. A process for sensing and evaluating knocking combustion during operation of an internal combustion engine having an ignition induced by a spark plug, said process comprising the steps of:

detecting the intensity of electromagnetic radiation emitted during combustion in a combustion chamber of an internal combustion engine with an optical sensor disposed in the combustion chamber wall so as to measure electromagnetic radiation in a part of the volume of the combustion chamber, wherein said electromagnetic radiation is different during knocking combustion than during non-knocking combustion;

transmitting a signal induced by the detected radiation to a measuring and processing system, wherein the intensity of the electromagnetic radiation is measured and compared to electromagnetic radiation previously determined during normal combustion in said part of the volume, said part of the volume in which electromagnetic radiation is measured being less than 0.04% of the displacement volume in the top piston dead center and being sufficiently displaced from the spark plug such that knocking combustion will be detected prior to detection of a flame induced by the spark plug; and determining the occurrence of knocking combustion by comparing the rate of increase in intensity of the electromagnetic radiation as a function of time to the rate of increase in intensity of electromagnetic radiation as a function of time upon non-knocking combustion, the rate of increase in intensity of electromagnetic radiation being significantly steeper during knocking combustion than during non-knocking combustion.

2. The process according to claim 1, wherein said volume is less than 0.004% of the displacement volume in said top piston dead center.

3. The process according to claim 1, wherein the step of determining includes feeding a voltage signal, representing the occurrence of knocking combustion and derived from the detected electromagnetic radiation, to said processing system when the rate of increase in the radiation intensity in the volume over time upon knocking combustion is at least three times higher than upon non-knocking combustion.

4. The process according to claim 1, wherein the step of determining includes feeding a voltage signal, representing the occurrence of knocking combustion and derived from the detected electromagnetic radiation, to said processing system when the rate of increase in the radiation intensity in the volume over time upon knocking combustion is at least twenty times higher than upon non-knocking combustion.

5. The process according to claim 1, additionally comprising the step of comparing the level of emitted radiation after an initial increase, to the level of emitted radiation after an initial increase during non-knocking combustion; and feeding a voltage signal, representing the occurrence of knocking combustion and derived from the detected electromagnetic radiation, to said processing system when: (1) the level of the emitted radiation after the initial increase during combustion at at least three times higher than during non-knocking combustion; and (2) the rate of increase in intensity over time is significantly higher than during non-knocking combustion.

6. The process according to claim 5, wherein said step of feeding a voltage signal occurs when the level of the emitted radiation after an initial increase is at least ten time higher than during non-knocking combustion.

* * * * *